United States Patent [19]

Leidenfrost

[11] Patent Number: 5,193,915
[45] Date of Patent: Mar. 16, 1993

[54] DEVICE FOR DELIVERING PRESSURIZED FLUID FROM A STATIONARY PART TO A ROTATABLE SHAFT

[76] Inventor: Reinhold Leidenfrost, Lerchenweg 1, 8439 Postbauer-Heng, Fed. Rep. of Germany

[21] Appl. No.: 893,126

[22] Filed: Jun. 3, 1992

[30] Foreign Application Priority Data

Jun. 13, 1991 [DE] Fed. Rep. of Germany ....... 4119465

[51] Int. Cl.$^5$ .............................................. F16C 32/06
[52] U.S. Cl. ..................................... 384/118; 384/114
[58] Field of Search ................. 384/100, 114, 118, 120

[56] References Cited

U.S. PATENT DOCUMENTS

| | | | |
|---|---|---|---|
| 3,476,447 | 11/1969 | Boyd | 384/120 |
| 4,185,878 | 1/1980 | Robert | 384/120 |
| 4,366,993 | 1/1983 | Ono et al. | 384/120 |
| 4,514,099 | 4/1985 | John et al. | 384/118 X |

FOREIGN PATENT DOCUMENTS 3325880 2/1990 Fed. Rep. of Germany .

Primary Examiner—Thomas R. Hannon
Attorney, Agent, or Firm—Henry M. Feiereisen

[57] ABSTRACT

A device for delivering pressurized fluid from a fixed housing to a rotatable shaft includes two hydrostatic bearings in form of circumferentially spaced recesses which are arranged in the housing for supporting the shaft. Extending between the hydrostatic bearings is a ring channel which is in communication with a feed bore in the shaft for supply of hydraulic pressurized fluid. For adaptation of the device to varying operational conditions, capillaries are provided whose effective length and thus throttle effect is adjustable for the pressurized fluid which enters the recesses of the hydrostatic bearings. The fixed housing is comprised of an inner ring and a concentric outer sleeve so that adjoining surfaces are formed therebetween, with the capillaries being provided in one of the adjoining surfaces and intersected by axial grooves. Through modifying the angular position of the sleeve relative to the ring, the throttle effect can be varied in a suitable manner.

14 Claims, 4 Drawing Sheets

DEVICE FOR DELIVERING PRESSURIZED FLUID FROM A STATIONARY PART TO A ROTATABLE SHAFT

BACKGROUND OF THE INVENTION

The present invention refers to a device for delivering a pressurized fluid from a stationary part to a rotatable shaft, and then to a fluid-utilization unit.

German publication DE-PS 33 25 880 discloses a device of the type having two hydrostatic bearings axially spaced from each other in the stationary housing and provided with circumferential recesses which are acted upon by a hydraulic pressurized fluid. Arranged between the hydrostatic bearings is a ring channel which is radially open towards the circumferential gap between the shaft and the housing and which is connected via leakage oil throttle gap with the recesses. In the area of this ring channel, the shaft is provided with a feed bore for the pressurized fluid, with the ring channel communicating with a closable outlet conduit which leads to the atmosphere or to a return line for leakage oil.

A device of this type should be applicable for a wide variety of different conditions, such as for example at varying viscosities and pressures of the pressurized fluid, varying speeds of the shaft and the like. In order to meet these conditions, different throttle effects are required, thus making it necessary to install corresponding capillaries (restrictors) within the conduits for delivering the pressurized fluid into the recesses. This, however, requires complicated and cumbersome modifications of the device.

SUMMARY OF THE INVENTION

It is thus an object of the present invention to provide an improved device for conducting a pressurized fluid from a stationary part to a rotatable part obviating the afore-stated drawbacks.

It is also an object of the present invention to provide an improved device of the above-stated type by which a selected throttle effect is attained through easy adjustability of the capillaries.

These objects and others which will become apparent hereinafter, are attained in accordance with the present invention by providing a stationary housing comprised of an inner ring including along the inside wall surface recesses from which radial bores are directed towards the outside, and an outer sleeve which is securely fitted upon the ring and has an inlet opening for the hydraulic pressurized fluid, with at least one of the adjoining cylindrical surfaces between the ring and the sleeve being provided with capillaries for creating a throttle effect which capillaries communicate on the one hand with the inlet opening in the sleeve and on the other hand with the radial bores of the ring. The capillaries (grooves of small cross section) may be made for example through milling in order to create suitably small cross sections.

It may be possible to provide the capillaries in one of the adjoining surfaces between the ring and the sleeve in circumferential direction, with the other cylindrical surface including axial grooves intersecting the capillaries. The location of the axial grooves relative to the capillaries can be selected in a manner suitable for creating varying effective lengths of the capillaries to generate the actual throttle effects. Thus, the throttle effect to be generated can easily be adjusted in accordance to prevailing conditions.

According to another feature of the present invention, the capillaries extend in the outer cylindrical surface of the ring essentially coextensive with the recesses and communicate with the recesses at one end thereof via the radial bores. Provided in the bore of the sleeve is a central circumferential groove which is in communication with the inlet opening and the axial grooves which intersect the capillaries.

It is, however, also possible to provide the sleeve with a central circumferential groove which is in communication with the inlet opening and with the axial grooves, with the capillaries extending in the sleeve in circumferential direction from the axial grooves essentially coextensive with the recesses. The ring is provided with the radial bores which lead into the recesses and communicate with the capillaries in the sleeve.

According to a variation of the present invention, it is also possible to provide the capillaries and the axial grooves in the same structural element of the fixed housing i.e. the ring or the sleeve. Varying throttle effects are then attained by subsequently milling the axial grooves at a desired location along the extension of the capillaries.

In all previously described embodiments, the modification of the throttle effect is generated solely by changing the effective length of the capillaries. It is, however, also possible to further adjust the throttle effect by varying the cross sectional area of the capillaries. The supply and discharge of pressurized fluid into and from the capillaries is provided at one end of the capillaries. When designing the capillaries with a cross section which continuously decreases from this end, the throttle effect is adjustable not only by modifying the distance of the intersecting groove from this end but also by changing the cross sectional area thereof.

According to a further embodiment of the present invention, the outer cylindrical surface of the ring is provided with capillaries which have a cross section continuously decreasing from one end and which extend at an angle relative to the longitudinal axis of the ring, with the sleeve being provided in its bore with corresponding capillaries at opposite inclination compared to the capillaries of the ring.

Suitably, the ring and the sleeve are biased to bear upon each other in a leak tight manner so that for example the supply of additional pressurized fluid is completely eliminated.

It will be understood that the cross sectional configuration of the capillaries in order to attain the desired throttle effect is of less importance. In many cases, a triangular configuration is selected, however, other configurations such as semi-circular shape or rectangular shape may be applicable.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
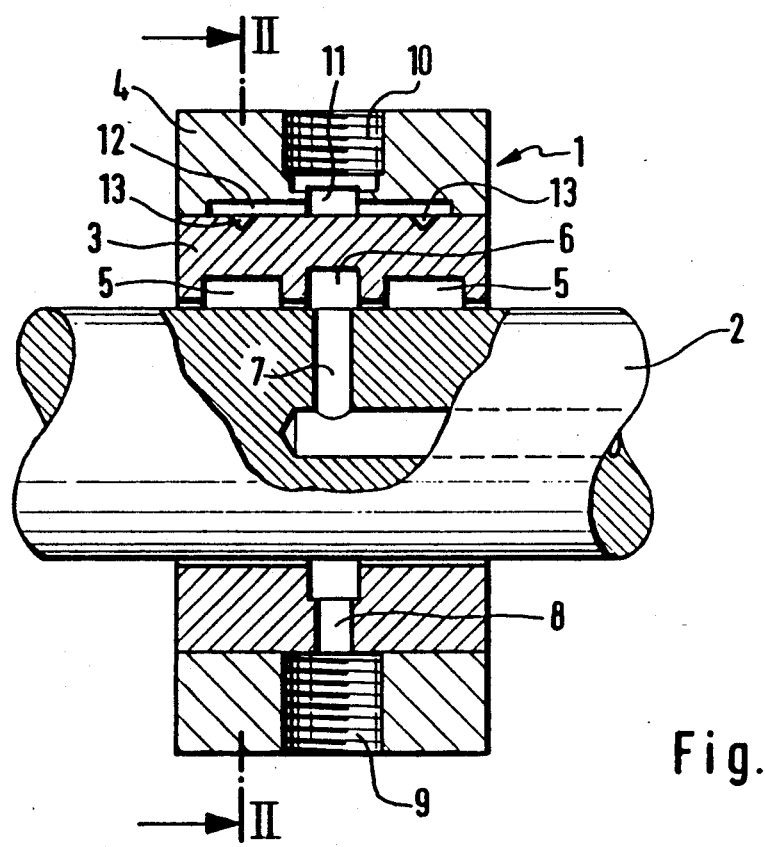
FIG. 1 is a longitudinal section of one embodiment of a device for delivering a pressurized fluid to a rotatable part in accordance with the invention.

Throughout all the Figures, the same or corresponding elements are always indicated by the same reference numerals.

Referring now to the drawing and in particular to FIG. 1, there is shown a longitudinal section of a first embodiment of a device for delivering a pressurized fluid from a stationary part to a rotatable part. The device includes a fixed housing which is generally designated by reference numeral 1 and has a central bore for receiving a shaft 2. The housing 1 includes an inner ring 3 which surrounds the shaft 2 and an outer sleeve 4 which concentrically encloses and is snugly fitted upon the inner ring 3. Axially spaced from each other in the bore of the inner ring 3 are two hydrostatic bearings in form of circumferentially spaced recesses 5 which are supplied with pressurized fluid. A ring channel 6 is arranged between both hydrostatic bearings in the bore of the ring 3 and is open towards the shaft 2. Provided within the shaft 2 is a feed bore 7 which communicates with the ring channel 6 and is connected to a not shown fluid-utilization unit such as for example a piston/cylinder arrangement. The ring channel 6 is further connected via a bore 8 to an outlet conduit 9 for connection to the atmosphere. Although not shown in detail, persons skilled in the art will understand that the outlet conduit 9 must contain a shutoff valve for allowing closing of the conduit 9 when the fluid-utilization unit is to be supplied with pressurized fluid.

Figure 2:
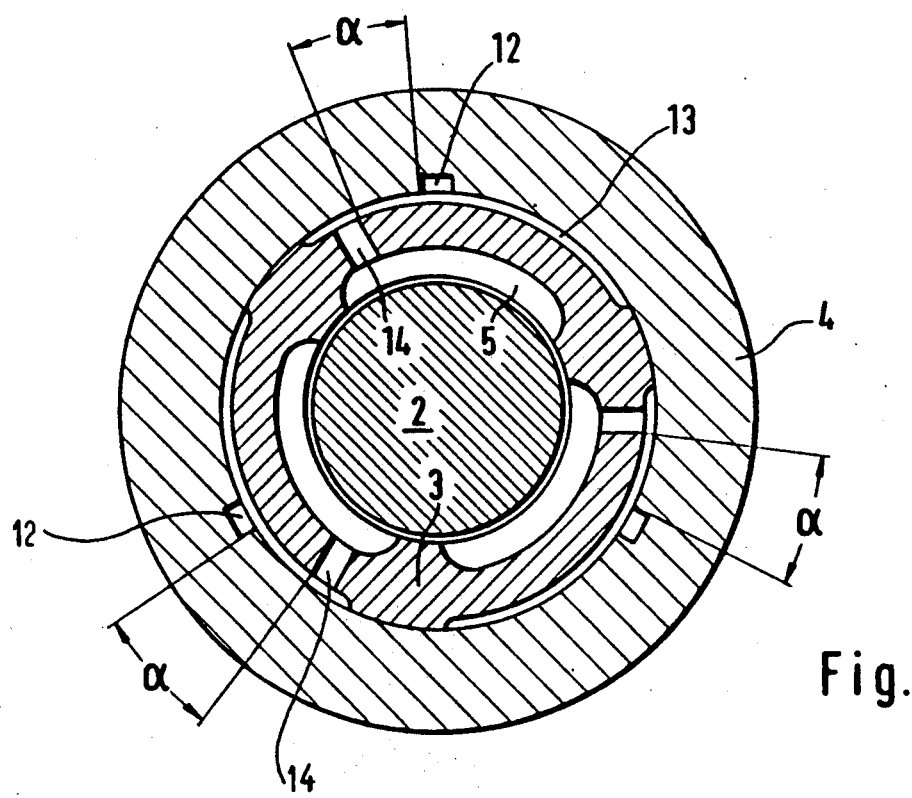
FIG. 2 is a cross section taken along the line II—II of FIG. 1.

The sleeve 4 includes an inlet opening 10 for supply of pressurized fluid. At its surface adjoining the inner ring 3, the sleeve 4 is provided with a central circumferential groove 11 and with axial grooves 12 which are in communication with the circumferential groove 11. The outer cylindrical surface of the ring 3 in opposition to the inner surface of the sleeve 4 is provided with capillaries 13 which, as shown in FIG. 2, extend essentially coextensive with the recesses 5 and are intersected by the axial grooves 12. At their one end, the capillaries 13 are connected to the recesses 5 via radial bores 14.

Through the provision of these capillaries 13, a throttle effect is generated which depends on the effective length of the capillaries 13 which length is defined by the distance of the respective axial groove 12 from the respective radial bore 14, as seen best in FIG. 2. By varying the effective length of the capillaries 13 through adjusting the angular position of the sleeve 4 relative to the ring 3, a desired throttle effect can be selected which is best suited for prevailing conditions.

Upon supply of pressurized fluid through the inlet opening 10, the pressurized fluid is throttled by the capillaries 13 and enters the recesses 5 to build up pressure and to form a fluid film in the circumferential gap between the inner ring 3 and the shaft 2. In this manner, the shaft 2 is hydrostatically supported. In case the valve in conduit 9 is open, leakage oil exiting the throttle gap is discharged to a return conduit (not shown) which is suitably connected to the outlet conduit 9. When the fluid-utilization unit is to be supplied with pressurized fluid e.g. for making a switching operation, the shutoff valve is actuated to close the conduit 9 so that pressurized fluid now enters the feed bore 7 in the shaft 2 and is delivered to the fluid-utilization unit. The mode of operation of such a device and the operativeness of hydrostatic bearings are generally known so that a detailed discussion thereof is omitted for sake of simplicity.

Persons skilled in the art will understand that the capillaries 13 are depicted in FIGS. 1 and 2 as well as in the following Figures at considerably enlarged scale for sake of illustration.

Figure 3:
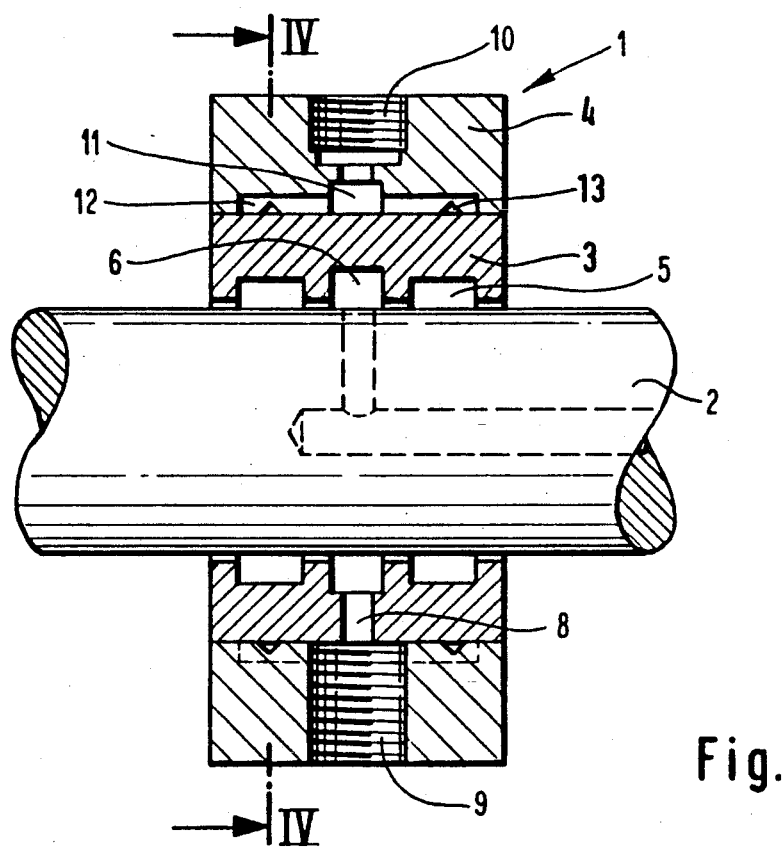
FIG. 3 is a longitudinal section of a second embodiment of a device for delivering a pressurized fluid to a rotatable part, taken along the line III—III of FIG. 4.
Figure 4:
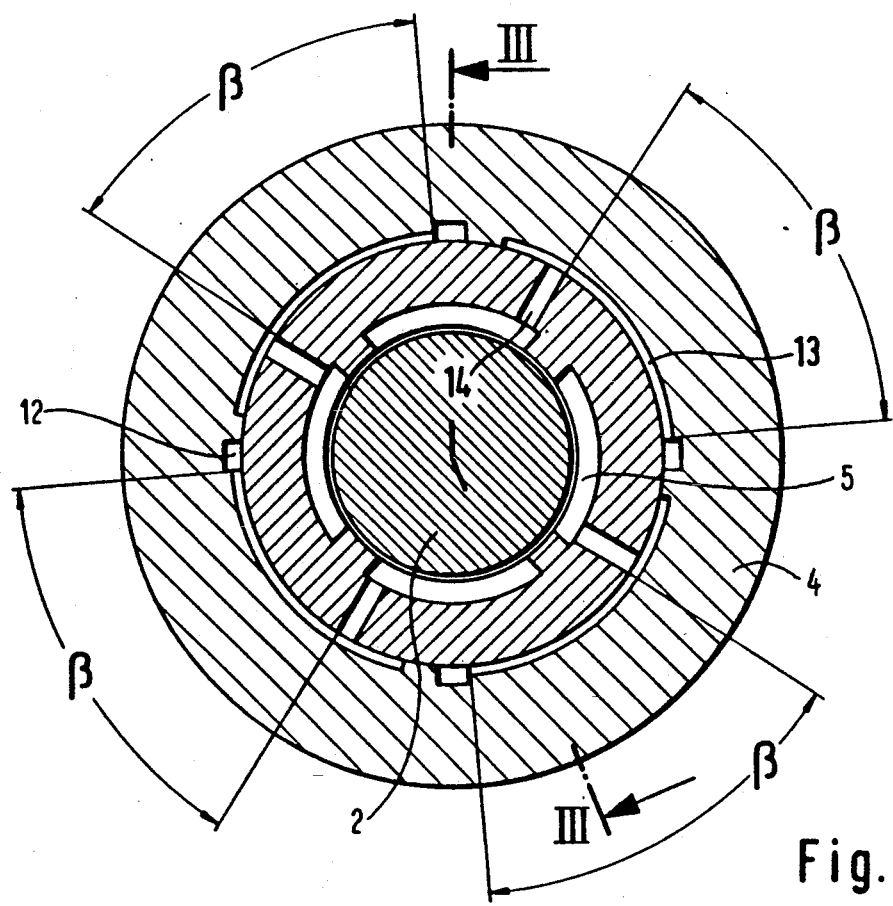
FIG. 4 is a cross section taken along the line IV—IV of FIG. 3.

Turning now to FIG. 3, there is shown a longitudinal section of a second embodiment of the device for delivering pressurized fluid from a fixed housing 1 to the rotatable shaft 2. The difference between this embodiment compared to the embodiment of FIG. 1 resides essentially in the arrangement of the capillaries 13 which, as shown in FIG. 3 are now machined in the bore of the sleeve 4. As shown in FIG. 4, which is a cross section taken along the line IV-IV of FIG. 3, the radial bores 14 for supply of the pressurized fluid into the recesses 5 are arranged in the inner ring 3 and communicate with the capillaries 13 in the outer sleeve 4. The effective length (designated in FIG. 4 by reference character of the capillaries 13 and thus the throttle effect again depends on the relative angular position between the sleeve 4 and the ring 3.

Figure 5:
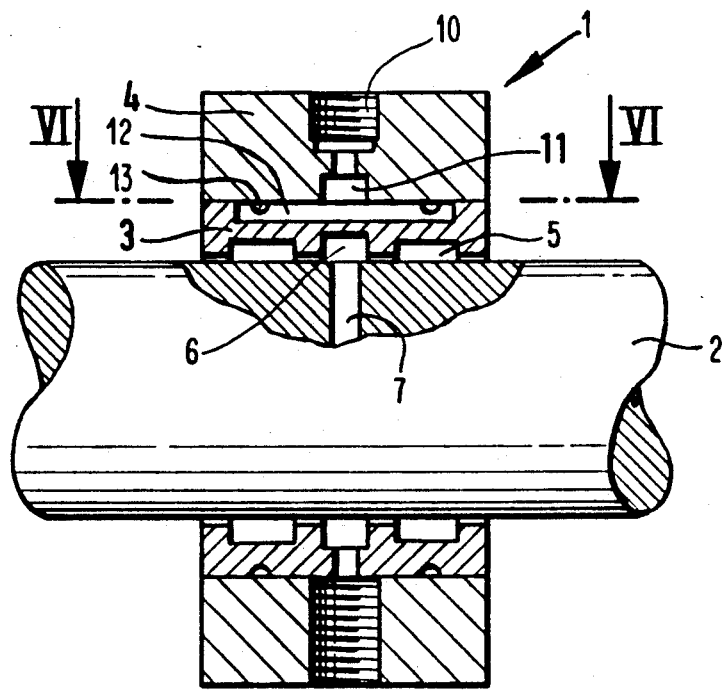
FIG. 5 is a longitudinal section of a third embodiment of a device for delivering a pressurized fluid to a rotatable part.
Figure 6:
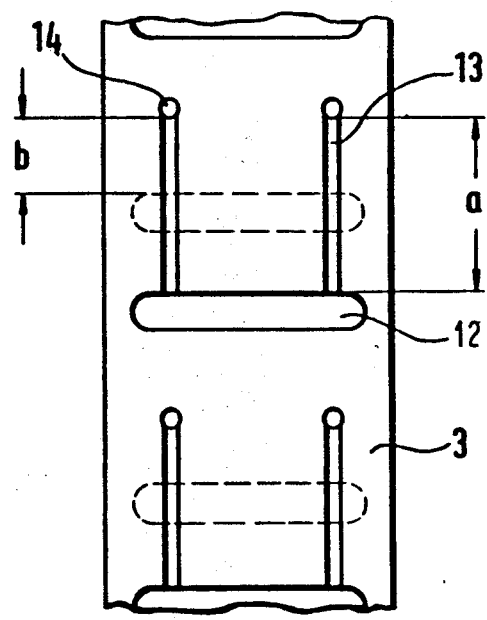
FIG. 6 is a top view upon a development of the device of FIG. 5 along the line VI—VI, illustrating in detail the inner ring.

In the embodiment as shown in FIGS. 5 and 6, only the circumferential groove 11 is provided in the bore of the sleeve 4 while the axial grooves 12 are now provided in the adjoining outer surface of the ring 3. As shown in particular by the top view of the development of the ring 3 according to FIG. 6, the axial grooves 12 intersect the circumferential capillaries 13 at one end thereof. The other end of the capillaries 13 communicate with the radial bores 14 so as to define an effective length of the capillaries which length is designated in FIG. 6 by reference character a. In order to adjust the throttle effect, it is possible to subsequently provide, e.g. through milling, axial grooves 12 at a different position along the capillaries 13. If it is desired to reduce the throttle effect, the axial grooves 12 can be provided at a position as illustrated in broken lines in FIG. 6 so that the capillary 13 has a comparably shorter effective length designated by reference character b in FIG. 6.

Figure 7:
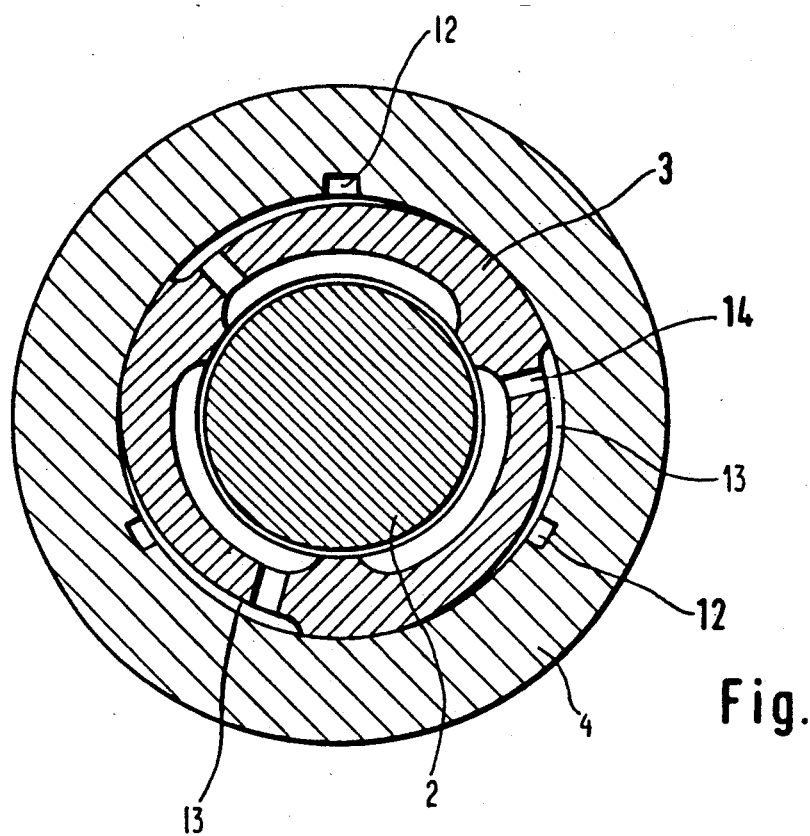
FIG. 7 is a cross section of a fourth embodiment of a device for delivering pressurized fluid to a rotatable part.

Referring now to FIG. 7, there is shown a cross section of a further embodiment of a device for delivering pressurized fluid from a fixed housing 1 to the rotatable shaft 2 which differs from the embodiment according to FIGS. 1 and 2 solely by the configuration of the capillaries 13. As shown in FIG. 7, the capillaries 13 are machined (e.g. milled) in the outer cylindrical surface of the ring 3 with a cross section which continuously decreases from the radial bore 14. In this manner, the throttle effect can be adjusted not only by modifying the effective length of the capillaries 13 but also through changing the cross sectional area thereof. For example, when turning the sleeve 4 in clockwise direction relative to the ring 3, the throttle effect is increased because on the one hand the distance of the axial grooves 12 from the radial bores 14 is longer to extend the effective length of the capillaries 13 and on the other hand the cross sectional area of the capillaries is further restricted.

Figure 8:
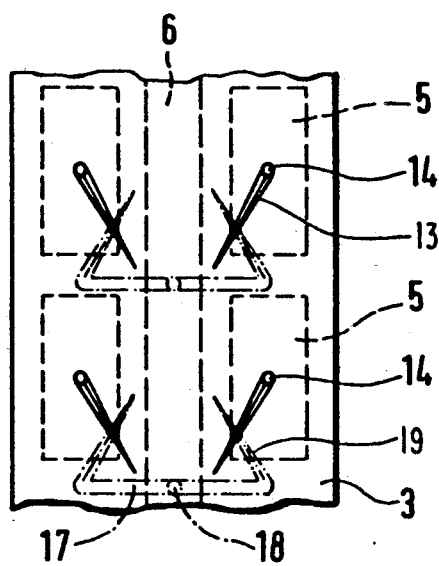
FIG. 8 is a top view of a fifth embodiment of a device for delivering pressurized fluid to a rotatable part, illustrating in detail a fragmentary development of the inner ring.

FIG. 8 refers to a further variation of the device according to the invention, and in particular illustrates a top view of a partial development of the ring 3, with the ring channel 6 as well as the recesses 5 being shown in broken lines and with the recesses 5 communicating with the capillaries 13 via the radial bores 14. As shown in FIG. 8, the capillaries 13 extend at an angle to the (not shown) longitudinal axis of the ring 3 and have a cross section which continuously decreases from the radial bores 14 toward the other end. The sleeve 4 is also provided in its bore with capillaries 19 which essentially correspond to the capillaries 13 but extend at opposite inclination compared to the capillaries 13 in the ring 3. The capillaries 19 are supplied with pressurized fluid via axial grooves 17 and through bores 18. By turning ring 3 and sleeve 4 relative to each other in one direction, the throttle effect can be increased while turning in the other direction will decrease the throttle effect.

While the invention has been illustrated and described as embodied in a device for delivering pressurized fluid from a stationary part to a rotatable shaft, it is not intended to be limited to the details shown since various modifications and structural changes may be made without departing in any way from the spirit of the present invention.

What is claimed as new and desired to be protected by Letters Patent is set forth in the appended claims:

1. A device for delivering a pressurized fluid from a stationary part to a rotating shaft, said device comprising:
   a fixed housing having an inner ring and an outer sleeve securely fitted upon said ring to define adjoining cylindrical surfaces, said sleeve being provided with an inlet opening for introduction of pressurized fluid and a closable outlet opening for allowing discharge of pressurized fluid;
   bearing means provided in said ring for supporting the shaft, said bearing means including two hydrostatic bearings spaced from each other in axial direction, with each hydrostatic bearing including circumferentially spaced recesses which are supplied with pressurized fluid from said inlet opening and communicate with outwardly extending radial bores, with a ring channel arranged between said hydrostatic bearings and communicating via leakage oil throttle gap with said recesses, wherein said ring channel is connected to a feed bore in the shaft for inflow of pressurized fluid and to said outlet opening of said sleeve; and
   restriction means provided in one of said adjoining surfaces between said ring and said sleeve for creating a throttle effect, said restriction means communicating with said inlet opening in said sleeve and with said radial bores in said ring.

2. The device as defined in claim 1 wherein said restriction means includes capillaries extending in circumferential direction in one of said adjoining surfaces between said ring and said sleeve, with said capillaries intersecting axial grooves in the other one of said adjoining surfaces.

3. The device as defined in claim 2 wherein said ring has an outer cylindrical surface, said capillaries extending in said outer cylindrical surface of said ring essentially coextensive with said recesses and having one end which is connected to said recesses via said radial bores, said sleeve being provided with a central circumferential groove which is in communication with said inlet opening and said axial grooves.

4. The device as defined in claim 2 wherein said sleeve includes a central circumferential groove in communication with said inlet opening and with said axial grooves, said capillaries being provided in said sleeve and extending from said axial grooves essentially coextensive with said recesses, said radial bores communicating with said recesses and with said capillaries in said sleeve.

5. The device as defined in claim 1 wherein said restriction means includes capillaries extending in circumferential direction in one of said adjoining surfaces between said ring and said sleeve, said capillaries being intersected by axial grooves, with said capillaries and said axial grooves being provided in a same structural element of said fixed housing.

6. The device as defined in claim 1 wherein said restriction means includes capillaries having one end in communication with said radial bores, said capillaries having continuously decreasing cross section from said one end in direction toward the other end of said capillaries.

7. The device as defined in claim 1 wherein said ring defines a longitudinal axis and has an outer cylindrical surface, said restriction means being provided in said outer cylindrical surface and including capillaries of continuously decreasing cross section and extending at an angle relative to said longitudinal axis of said ring, said sleeve having a bore provided with corresponding capillaries at opposite inclination compared to said capillaries of said ring.

8. The device as defined in claim 1 wherein said ring and said sleeve are biased to bear upon each other in a leaktight manner.

9. A fluid feed device for delivering a pressurized fluid from a stationary part to a rotatable shaft of the type having a feed bore connected to a fluid-utilization unit, said device comprising:
   a fixed housing including an inner ring and an outer sleeve securely fitted upon said ring for defining adjoining surfaces, said sleeve being provided with an inlet opening for introduction of pressurized fluid and a closable outlet opening for allowing discharge of pressurized fluid;
   bearing means in form of circumferentially spaced recesses which are provided in said ring for hydrostatically supporting the shaft;
   fluid-carrying passageway means for providing communication between said inlet opening and said recesses and selectively connecting said recesses with said outlet opening and the feed bore; and
   restriction means arranged in said passageway means in one of said adjoining surfaces between said ring and said sleeve for generating a throttle effect, said sleeve being adjustable relative to said ring for allowing selection of a suitable throttle effect.

10. The device as defined in claim 9 wherein said restriction means includes circumferential capillaries, said passageway means including radial bores extending in said ring between said recesses and said capillaries, and axial grooves communicating with said inlet opening and intersecting said capillaries so that said capillaries generate the throttle effect in dependence on its effective length defined by the distance of said axial grooves from said radial bores.

11. The device as defined in claim 10 wherein said capillaries extend essentially coextensive with said recesses, said passageway means further including a central circumferential groove provided in said sleeve and communicating with said inlet opening and said axial grooves.

12. The device as defined in claim 10 wherein said capillaries have one end in communication with said radial bores, said capillaries having continuously decreasing cross section from said one end in direction toward the other end thereof.

13. The device as defined in claim 10 wherein said ring defines a longitudinal axis, said capillaries extending at an angle relative to said longitudinal axis of said ring, with said sleeve being provided with corresponding capillaries at opposite inclination compared to said capillaries of said ring.

14. The device as defined in claim 10 wherein said capillaries and said axial grooves are selectively provided in said adjoining surfaces between said ring and said sleeve.

* * * * *